(12) United States Patent
Horng (10) Patent No.: US 8,952,586 B2
(45) Date of Patent: Feb. 10, 2015

(54) COMPONENT POSITIONING STRUCTURE FOR COMPONENTS RECEIVED IN A MOTOR'S SHAFT TUBE

(75) Inventor: Alex Horng, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 24 days.

(21) Appl. No.: 13/044,611

(22) Filed: Mar. 10, 2011

(65) Prior Publication Data

US 2012/0192409 A1 Aug. 2, 2012

(30) Foreign Application Priority Data

Feb. 1, 2011 (TW) .............................. 100103817 A (51) Int. Cl.
*H02K 5/00* (2006.01)
*H02K 1/18* (2006.01)
*H02K 5/167* (2006.01)
*H02K 7/08* (2006.01)

(52) U.S. Cl.
CPC .............. *H02K 1/187* (2013.01); *H02K 5/1675* (2013.01); *H02K 7/085* (2013.01)
USPC .................. 310/91; 310/67 R; 310/89; 29/732

(58) Field of Classification Search
USPC ................... 29/729, 732–736, 739, 596–598; 310/190, 67 R, 51, 89–91
See application file for complete search history.

(56) References Cited

U.S. PATENT DOCUMENTS

| | | | |
|---|---|---|---|
| 6,072,261 A * | 6/2000 | Lin | 310/424 |
| 6,246,140 B1 * | 6/2001 | Horng | 310/91 |
| 6,617,736 B1 * | 9/2003 | Horng et al. | 310/91 |
| 6,654,213 B2 | 11/2003 | Horng et al. | |
| 6,882,074 B2 * | 4/2005 | Horng et al. | 310/90 |
| 7,224,095 B2 * | 5/2007 | Chen | 310/190 |
| 7,485,995 B2 * | 2/2009 | Ku et al. | 310/91 |
| 7,884,512 B2 * | 2/2011 | Horng et al. | 310/67 R |
| 2005/0006962 A1 * | 1/2005 | Horng | 310/51 |
| 2008/0056627 A1 | 3/2008 | Horng et al. | |
| 2008/0315058 A1 | 12/2008 | Zarpellon | |
| 2009/0261672 A1 | 10/2009 | Horng et al. | |
| 2009/0309438 A1 | 12/2009 | Horng | |
| 2010/0127588 A1 | 5/2010 | Horng | |

FOREIGN PATENT DOCUMENTS

TW 201041279 A1 11/2010

* cited by examiner

*Primary Examiner* — Minh Trinh
(74) *Attorney, Agent, or Firm* — Alan D. Kamrath; Kamrath IP Lawfirm, P.A.

(57) ABSTRACT

A component positioning structure for components received in a motor's shaft tube includes a base and a stator unit. The base has a shaft tube, and shaft tube has an opening end having a deformable portion. The stator unit is fitted to an outer circumferential wall of the shaft tube and has a pressing portion. The pressing portion abuts against the deformable portion and causes deformation of the deformable portion, allowing the deformable portion to reduce an inner diameter of the opening end.

21 Claims, 9 Drawing Sheets

COMPONENT POSITIONING STRUCTURE FOR COMPONENTS RECEIVED IN A MOTOR'S SHAFT TUBE

BACKGROUND OF THE INVENTION

1. Field of the Invention

The present invention generally relates to a component positioning structure and, more particularly, to a component positioning structure for components received in a motor's shaft tube.

2. Description of the Related Art

Figure 1:
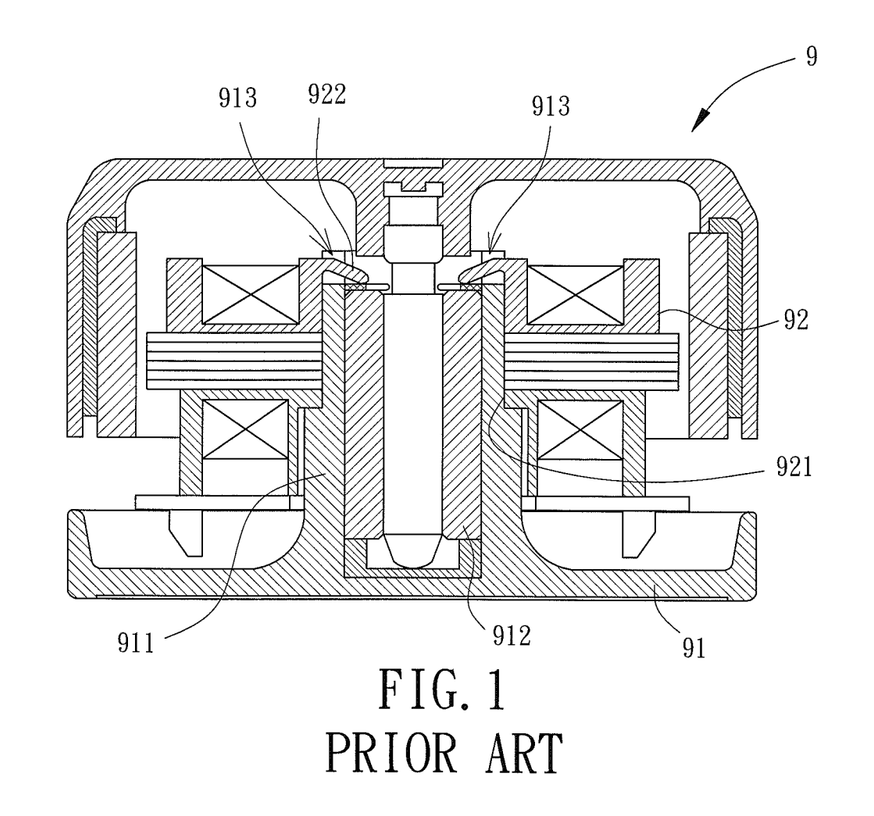
FIG. 1 shows a side cross-sectional view of a conventional motor stator disclosed by Taiwanese Patent Publication No. 201041279.

Referring to FIG. 1, a conventional motor stator is disclosed by Taiwanese Patent Publication No. 201041279 entitled "the motor stator". The conventional motor stator has a component positioning structure 9 that serves the purpose of positioning the components received in a shaft tube of the motor. The component positioning structure 9 includes a housing 91 and a stator 92. The housing 91 has a shaft tube 911 having a bearing 912 disposed therein, with at least one groove 913 arranged on a top of the shaft tube 911. The stator 92 is fitted around the shaft tube 911 via an assembly hole 921 thereof and includes at least one positioning member 922. The at least one positioning member 922 extends through the at least one groove 913 inwards from the shaft tube 911, to hold the bearing 912 in position.

In the above component positioning structure 9, the at least one positioning member 922 extends inwards and downwards to finally touch and press the bearing 912. Generally, the area where the at least one positioning member 922 and the stator 92 are coupled with each other is small, allowing the at least one positioning member 922 to apply a pressing force onto the bearing 912. However, this leads to the weak combination between the at least one positioning member 922 and the stator 92 such that the at least one positioning member 922 will snap off more easily when the bearing 912 suffers a large axial play and causes the at least one positioning member 922 to swing up and down intensively. In such a case, it would be difficult to keep the bearing 912 in the shaft tube 911, and the vibrations of the bearing 912 and other related components will lead to generation of noises, thus shortening the service life of the motor.

SUMMARY OF THE INVENTION

It is therefore the primary objective of this invention to provide a component positioning structure for components received in a motor's shaft tube, in which the component positioning structure holds the received components of the shaft tube in position via the deformation of the shaft tube.

The invention discloses a component positioning structure for components received in a motor's shaft tube. The component positioning structure includes a base and a stator unit. The base has a shaft tube, and the shaft tube has an opening end having a deformable portion. The stator unit is fitted to an outer circumferential wall of the shaft tube and has a pressing portion. The pressing portion abuts against the deformable portion and causes deformation of the deformable portion, allowing the deformable portion to reduce an inner diameter of the opening end.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

In the various figures of the drawings, the same numerals designate the same or similar parts. Furthermore, when the terms "first", "second", "third", "fourth", "inner", "outer", "top", "bottom" and similar terms are used hereinafter, it should be understood that these terms refer only to the structure shown in the drawings as it would appear to a person viewing the drawings, and are utilized only to facilitate describing the invention.

DETAILED DESCRIPTION OF THE INVENTION

Figure 2:
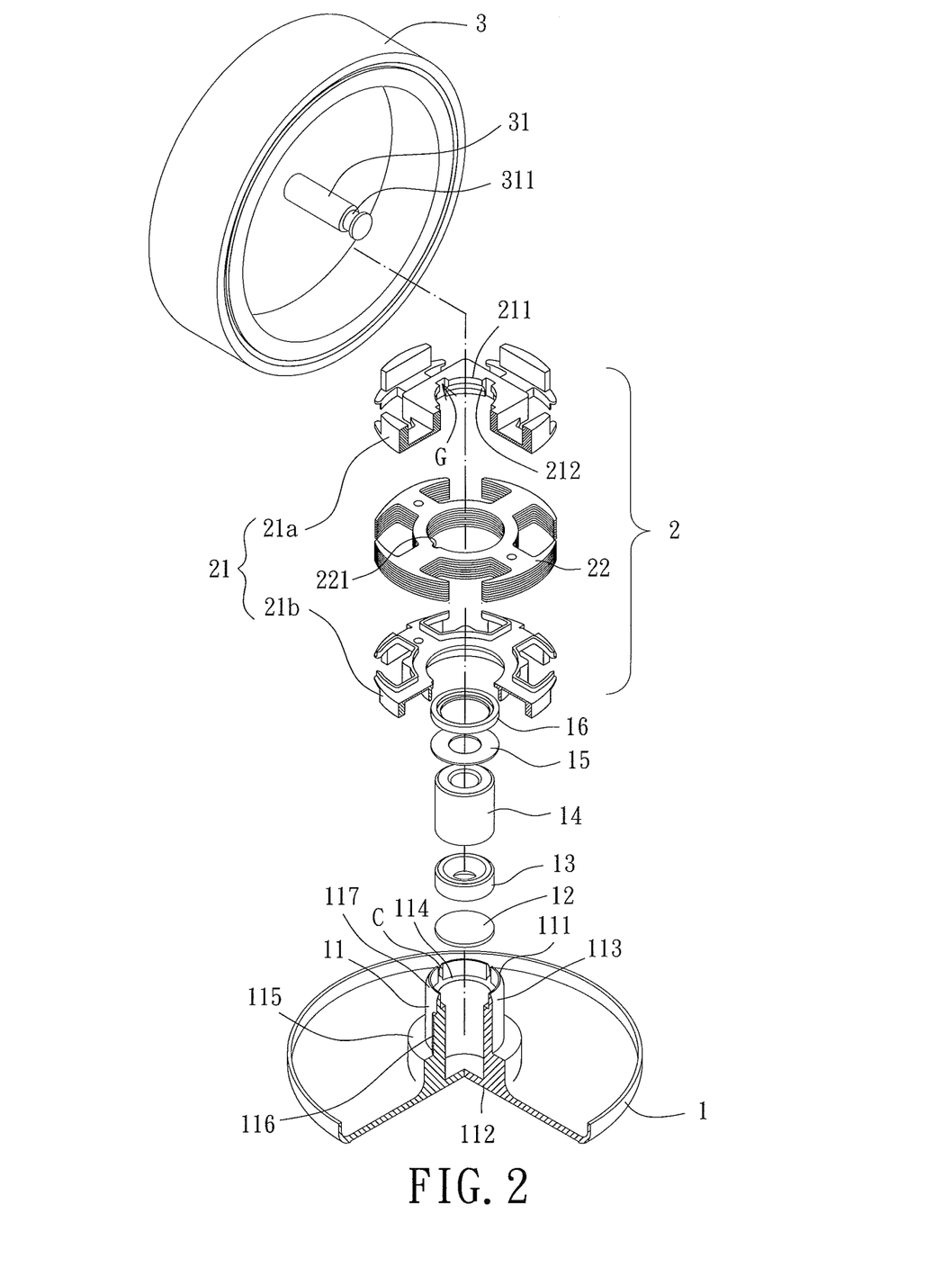
FIG. 2 shows an exploded diagram of a motor having a component positioning structure for components received in the motor's shaft tube according to a first embodiment of the invention.
Figure 3:
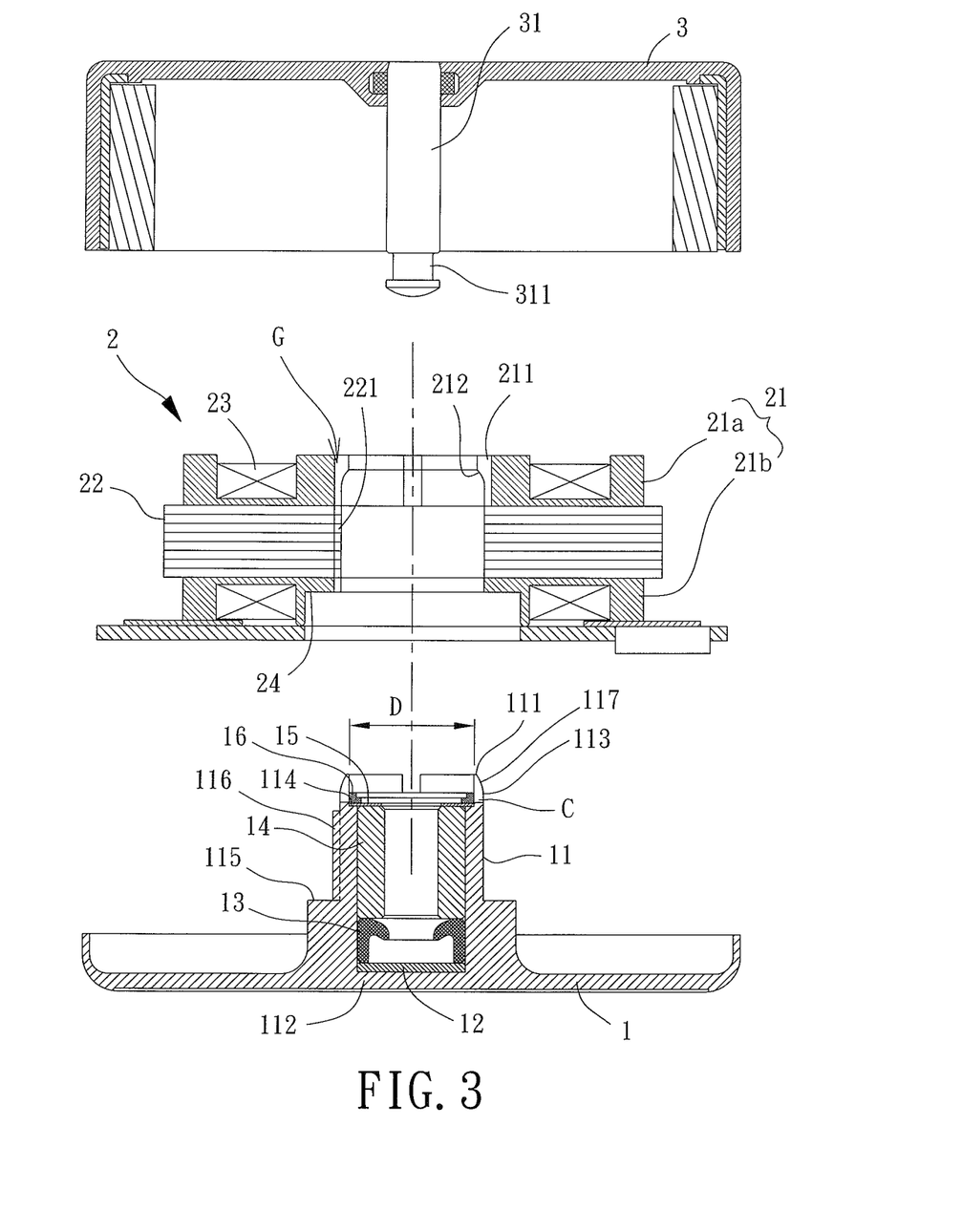
FIG. 3 shows an exploded side cross-sectional diagram of a motor having a component positioning structure for components received in the motor's shaft tube according to a first embodiment of the invention before the motor is assembled.

Referring to FIGS. 2 and 3, a component positioning structure that holds components received in a motor's shaft tube in position is disclosed according to a first embodiment of the invention. The component positioning structure includes a base 1 and a stator unit 2. The stator unit 2 can be disposed on the base 1 and coupled with a rotor 3 to form a motor.

Figure 5:
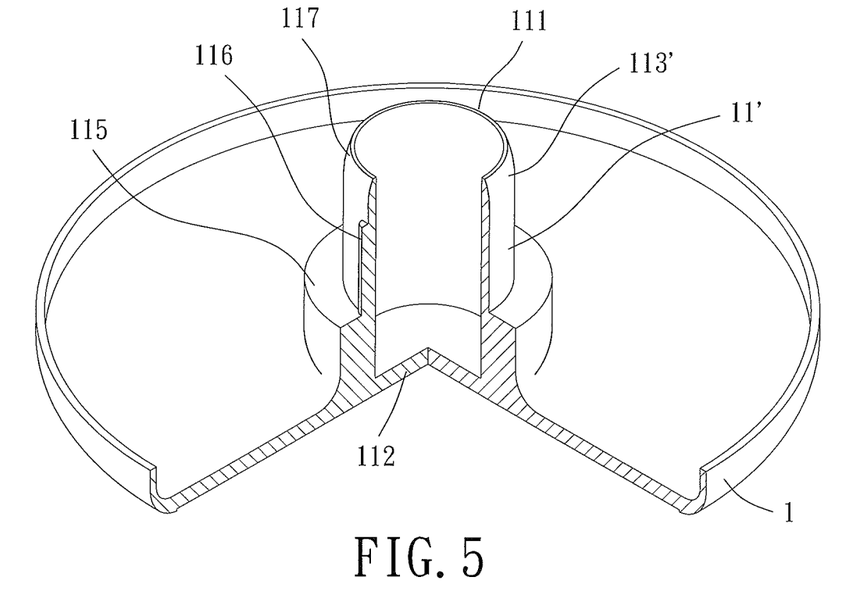
FIG. 5 shows an implementation of a deformable portion of the motor of the first embodiment.

The base 1 has a shaft tube 11 having an opening end 111 and an enclosed end 112. The opening end 111 has an inner diameter D. The enclosed end 112 may be enclosed as originally manufactured, or may be an opening later enclosed by an enclosing covering (not shown), as can be understood by one skilled in this art. The opening end 111 has a deformable portion 113 which can be of any structure capable of changing the inner diameter D of the opening end 111. Referring to FIGS. 2 and 3, for example, the opening end 111 has a plurality of interstices C extending from an inner circumferential wall to an outer circumferential wall of the shaft tube 11 in an axial direction thereof, allowing one deformable portion 113 to be formed between two adjacent interstices C. Based on this, the deformable portion 113 is allowed to reduce the inner diameter D thereof. Alternatively, as shown in FIG. 5, a shaft tube 11' may have a deformable portion 113' implemented as an annular wall on the opening end 111. One skilled in this art may readily appreciate that the thickness of the annular wall should be implemented in a size that allows the inner diameter D of the opening end 111 to be changed as desired. Therefore, it is not described herein again.

The shaft tube 11 may be used to receive components such as a wear-resistant plate 12, an engaging ring 13 and a bearing 14 in sequence. Preferably, the received components of the shaft tube 11 may further comprise a spacer 15 and a positioning ring 16. The spacer 15 is disposed on a top of the bearing 14 as shown in FIG. 2, to prevent the lubricant from leaking. The positioning ring 16 is disposed on a top face of the spacer 15. In addition, the positioning ring 16 may be coupled with the inner circumferential wall of the shaft tube 11 in a tight fitting manner to enhance the positioning effect of the received components of the shaft tube 11, such as the spacer 15 and bearing 14. Specifically, as shown in FIG. 2, the shaft tube 11 further includes an inner annular shoulder portion 114 on the inner circumferential wall thereof. The spacer 15 and positioning ring16 may be disposed on the inner annular shoulder portion 114. Alternatively, the inner annular shoulder portion 114 may be omitted so that the spacer 15 and positioning ring 16 are directly disposed on the top of the bearing 14.

Furthermore, the shaft tube 11 may further include a first annular shoulder portion 115 and a first anti-rotation portion 116 on the outer circumferential wall thereof. The first annular shoulder portion 115 is used to support and position the stator unit 2, and the first anti-rotation portion 116 is used to prevent the radial rotation of the stator unit 2. In this embodiment shown in FIG. 2, the first anti-rotation portion 116 is implemented as a protruding bar extending axially on the outer circumferential wall of the shaft tube 11.

Figure 4:
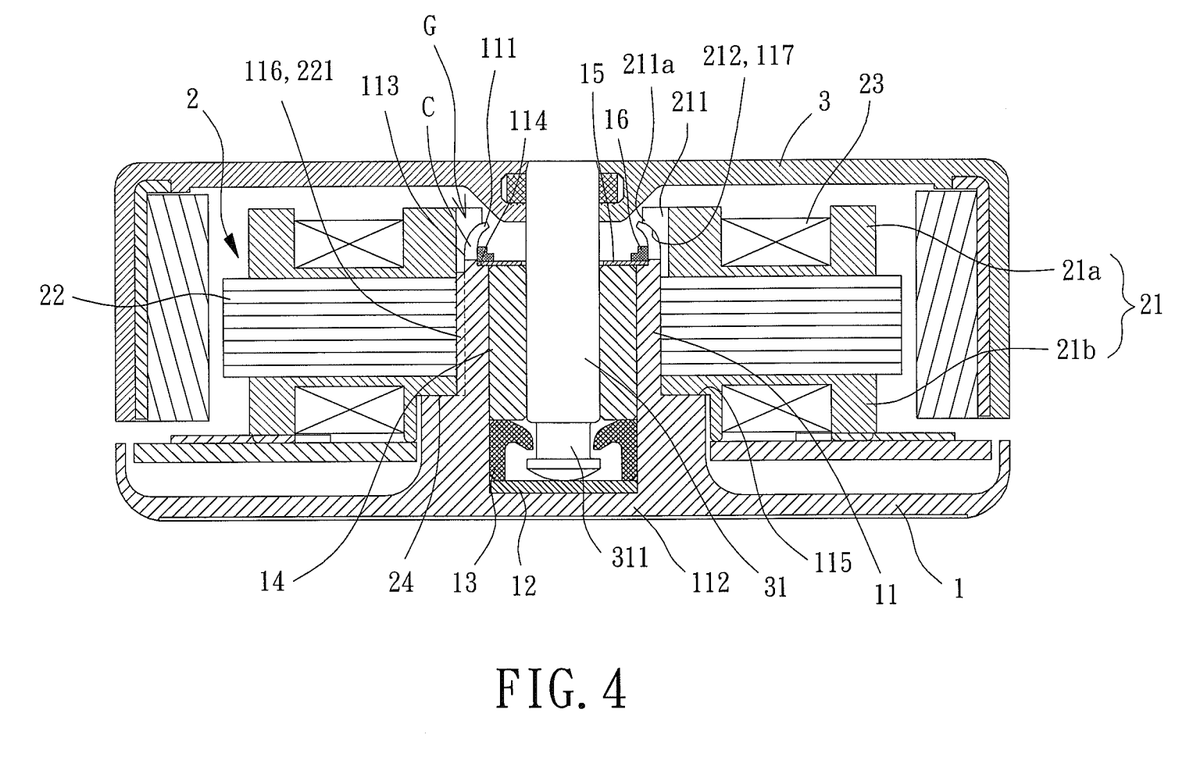
FIG. 4 shows a side cross-sectional diagram of the motor of the first embodiment after the motor is assembled.
Figure 6:
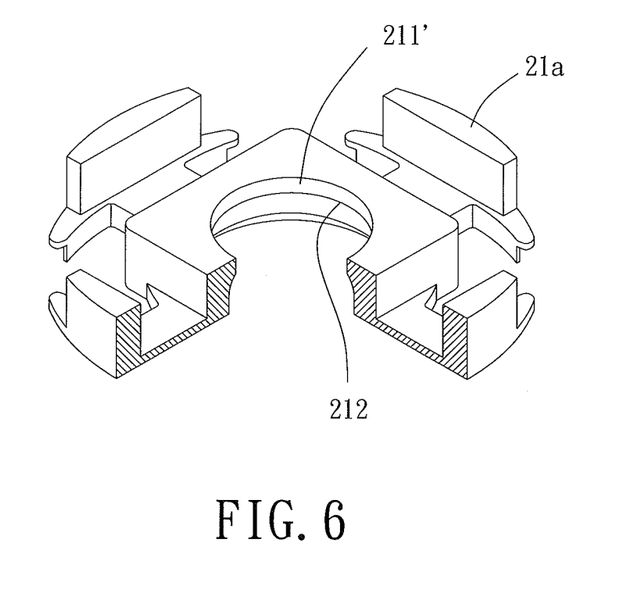
FIG. 6 shows an implementation of a pressing portion of a stator unit of the motor in the first embodiment.

Referring to FIGS. 2 and 3 again, the stator unit 2 is formed by two steps: (1) coupling an insulation sleeve unit 21 with a silicon steel plate unit consisting of a plurality of silicon steel plates stacked with each other, and (2) winding an enameled wire 23 around the combined structure of the insulation sleeve unit 21 and silicon steel plate unit to form coils. The stator unit 2 may be fitted to an outer circumferential wall of the shaft tube 11. The insulation sleeve unit 21 may be a single insulation sleeve or may consist of an upper insulation sleeve and a lower insulation sleeve. In this embodiment, the insulation sleeve unit 21 is implemented as an upper insulation sleeve 21a and a lower insulation sleeve 21b between which the silicon steel plate unit is sandwiched, which provides a better insulation effect. The insulation sleeve unit 21 includes a pressing portion 211 which can be of any form capable of reducing the size of the opening end 111 by pressing the deformable portion 113. In such an arrangement, the received components of the shaft tube 11 are prevented from escaping from the shaft tube 11, thereby securely holding the received components of the shaft tube 11 in position. For example, as shown in FIGS. 2 and 3, the upper insulation sleeve 21a includes at least one gap G that is located on an inner circumferential wall thereof and extends to a top face thereof. The at least one gap G divides the pressing portion 211 into a plurality of protrusions. As shown in FIG. 4, the pressing portion 211 has an annular corner 211a on an end thereof, with the annular corner 211a radially extending inward from the inner circumferential wall. In this embodiment, the at least one gap G includes a plurality of gaps G As shown in FIG. 6, the upper insulation sleeve 21a may include a pressing portion 211' in the form of an annular lip extending inwards radially from an upper portion of the inner circumferential wall of the upper insulation sleeve 21a.

Referring to FIGS. 2 and 3 again, one of the pressing portion 211 and deformable portion 113 may further include a guiding face (as denoted as 212 in this case) abutting against the other one of the pressing portion 211 and deformable portion 113. Alternatively, the pressing portion 211 and deformable portion 113 may both include a guiding face abutting against each other. The guiding face 212 of the pressing portion 211 may be implemented as a cambered or inclined face that guides the movement of the deformable portion 113 and forces the deformable portion 113 to be bent inwards when the deformable portion 113 is coupled with the pressing portion 211, thereby reducing the inner diameter D of the opening end 111. In the embodiment as shown, it is the pressing portion 211 that includes the guiding face 212 abutting against the deformable portion 113, with the guiding face 212 being in the form of a cambered face. In addition, the deformable portion 113 further includes an auxiliary guiding face 117 on an outer face thereof that corresponds to the guiding face 212 of the pressing portion 211. The auxiliary guiding face 117 may also be formed as a cambered face corresponding to the cambered face of the guiding face 212. In such an arrangement, the pressing portion 211 not only can force the deformable portion 113 to deform more easily for further reducing the inner diameter D of the opening end 111, but also can have an improved abutting effect against the deformable portion 113.

Besides, the stator unit 2 further includes a second annular shoulder portion 24 and a second anti-rotation portion 221. The second annular shoulder portion 24 may abut against the first annular shoulder portion 115 of the shaft tube 11 so that the stator unit 2 may be positioned at a predetermined position on the outer circumferential wall of the shaft tube 11. In this way, the stator unit 2 may be positioned at a proper height, ensuring that the pressing portion 211 can force the deformable portion 113 to be bent inwards properly (without excessive bending of the deformable portion 113). The second anti-rotation portion 221 can be aligned and coupled with the first anti-rotation portion 116 of the shaft tube 11. In this embodiment, the second anti-rotation portion 221 is implemented as a groove extending axially on an inner face of a silicon steel plate unit of the stator unit 2 that consists of a plurality of silicon steel plates 22 stacked with each other. Thus, the protruding bar of the first anti-rotation portion 116 may be extended into the groove of the second anti-rotation portion 221. Since the pressing portion 211 has the plurality of gaps G, one of the gaps G can be axially aligned with the second anti-rotation portion 221 so that the position of the second anti-rotation portion 221 can be determined through that aligned gap G. In this way, it will be convenient to align and couple the second anti-rotation portion 221 with the first anti-rotation portion 116. In another implementation, the at least one gap G of the pressing portion 211 can only include a single gap G Based on this, when assembling the insulation sleeve unit 21 and the silicon steel plate unit formed by the silicon steel plates 22, the position of the second anti-rotation portion 221 can be quickly determined by aligning the single gap G of the pressing portion 211 with the second anti-rotation portion 221 of the silicon steel plate unit.

Referring to FIGS. 3 and 4, when assembling the motor, the wear-resistant plate 12, engaging ring 13, bearing 14, spacer 15 and positioning ring 16 are disposed into the shaft tube 11 via the opening end 111 in order, and the stator unit 2 is then fitted around the shaft tube 11. Meanwhile, at the moment the pressing portion 211 of the stator unit 2 touches the deformable portion 113 as the shaft tube 11 is being fitted through the stator unit 2, the auxiliary guiding face 117 will be guided by the guiding face 212, and the annular corner 211a of the pressing portion 211 abuts against the deformable portion 113, forcing the deformable portion 113 to be bent inwards. Thus, the inner diameter D of the opening end 111 is reduced to a proper size by the time the second annular shoulder portion 24 of the stator unit 2 abuts against the first annular shoulder portion 115 of the shaft tube 11. Finally, a shaft 31 of the rotor 3 is extended through the stator unit 2, positioning ring 16, spacer 15, bearing 14 and engaging ring 13 in order, allowing an engaging groove 311 of the shaft 31 to be engaged with the engaging ring 13. As such, assembly of the motor is completed. In addition, the rotor 3 may further include a plurality of vanes (not shown) to form a fan. In this way, the inner diameter D of the opening end 111 will be small enough to prevent the related components such as positioning ring 16, spacer 15 and bearing 14 from escaping. Thus, the received components of the shaft tube 11 can be efficiently held in the shaft tube 11 without escaping from the shaft tube 11.

Figure 7:
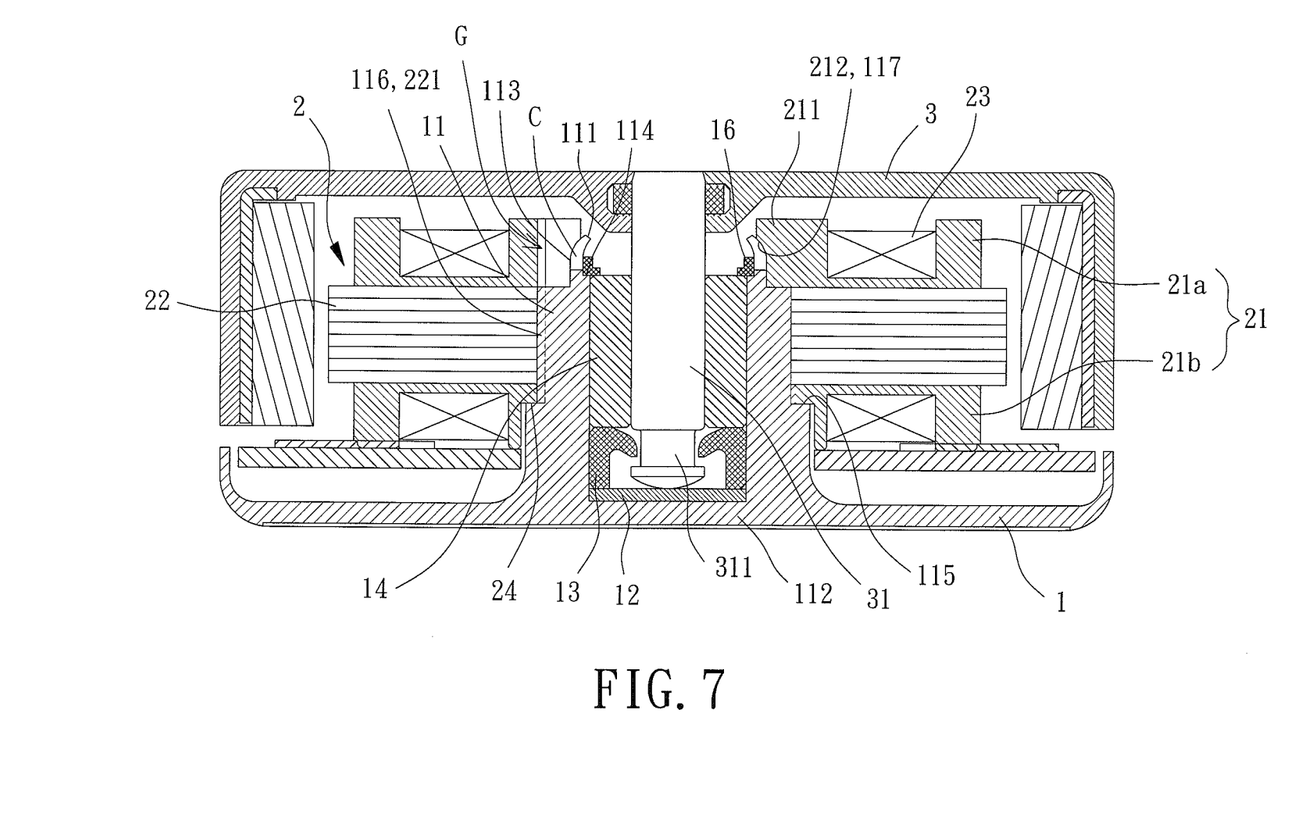
FIG. 7 shows an implementation of the component positioning structure of the first embodiment.
Figure 8:
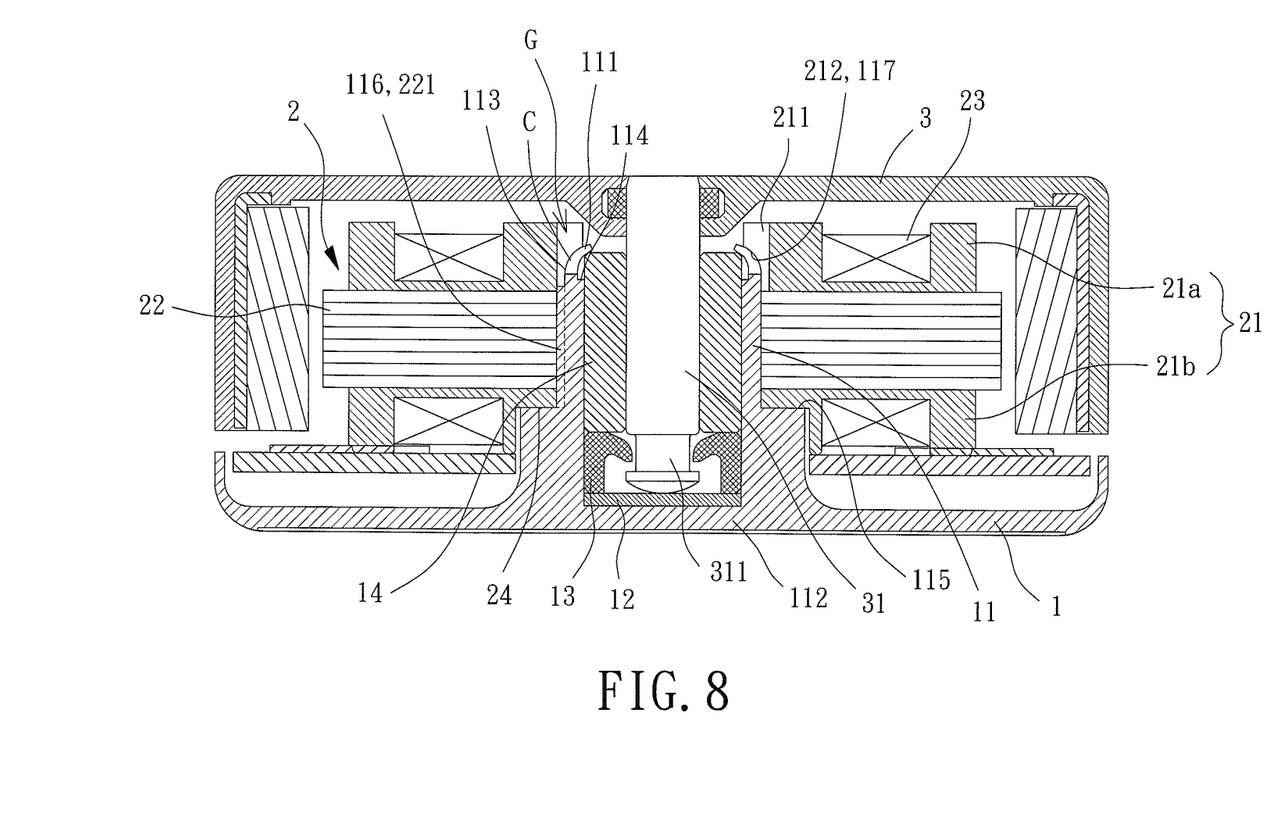
FIG. 8 shows another implementation of the component positioning structure of the first embodiment.

Moreover, referring to FIGS. 4, 7 and 8, a side cross-sectional diagram of the motor having the shaft tube 11 receiving some related components is shown. In FIG. 7, the shaft tube 11 does not receive the spacer 15 anymore. Instead, the positioning ring 16 is directly disposed on the inner annular shoulder portion 114 and bearing 14, with the deformable portion 113 being able to press the positioning ring 16 properly for securely holding the received components of the shaft tube 11 in position. Alternatively, as shown in FIG. 8, the shaft tube 11 does not receive the spacer 15 and positioning ring 16 anymore, which enables the deformable portion 113 to press the bearing 14 directly. Overall, the structure design of the deformable portion 113 and pressing portion 211 can provide a desired positioning effect for the received components of the shaft tube 11, and also can prevent loosening and escape of the received components of the shaft tube 11 no matter how the received components are changed.

The component positioning structure for holding received components of a motor's shaft tube is characterized in that the shaft tube 11 is designed with the deformable portion 113 on the opening end 111 thereof, and the stator unit 2 is designed with the pressing portion 211 that can force the deformable portion 113 to reduce the inner diameter D of the opening end 111. In such an arrangement, the deformable portion 113 can be bent inwards by the pressing portion 211 to properly reduce the inner diameter D of the opening end 111 during motor assembly. This prevents the received components of the shaft tube 11 from escaping from the shaft tube 11 through the opening end 111, thereby securely holding the received components of the shaft tube 11 in position. Therefore, the motor vibration can be avoided and the noise caused by the motor vibration is also avoided, thus increasing the service life of the motor. In other words, the invention provides a holding and positioning effect for the received components of the shaft tube 11 through both the deformable portion 113 and pressing portion 211. Thus, the invention can overcome the prior art problem where the at least one positioning member 922 is easy to snap off (since it is the only component that abuts against the bearing 912). In comparison to the prior art component positioning structure 9, the invention improves the positioning effect for the received components of the motor's shaft tube.

Figure 9:
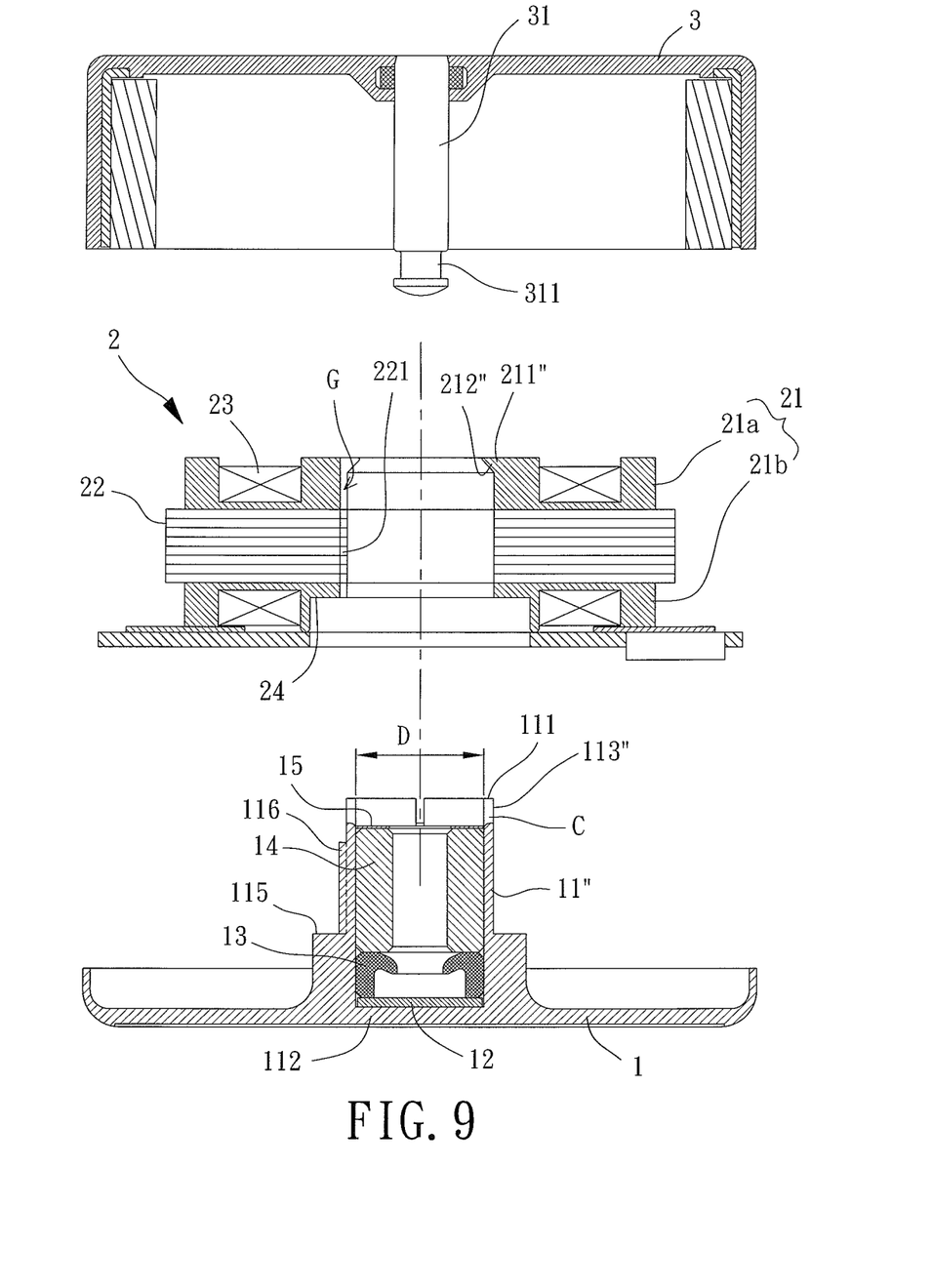
FIG. 9 shows an exploded side cross-sectional diagram of a motor having a component positioning structure for components received in the motor's shaft tube according to a second embodiment of the invention before the motor is assembled.

Referring to FIG. 9, a component positioning structure for holding received components of a motor's shaft tube in position is disclosed according to a second embodiment of the invention. The component positioning structure of the second embodiment also comprises the base 1 and stator unit 2. In comparison to the first embodiment, the motor in the second embodiment has a shaft tube 11" without the inner annular shoulder portion 114, a deformable portion 113" without the auxiliary guiding face 117, and a pressing portion 211" with a guiding face 212" implemented as a reclined face.

Figure 10:
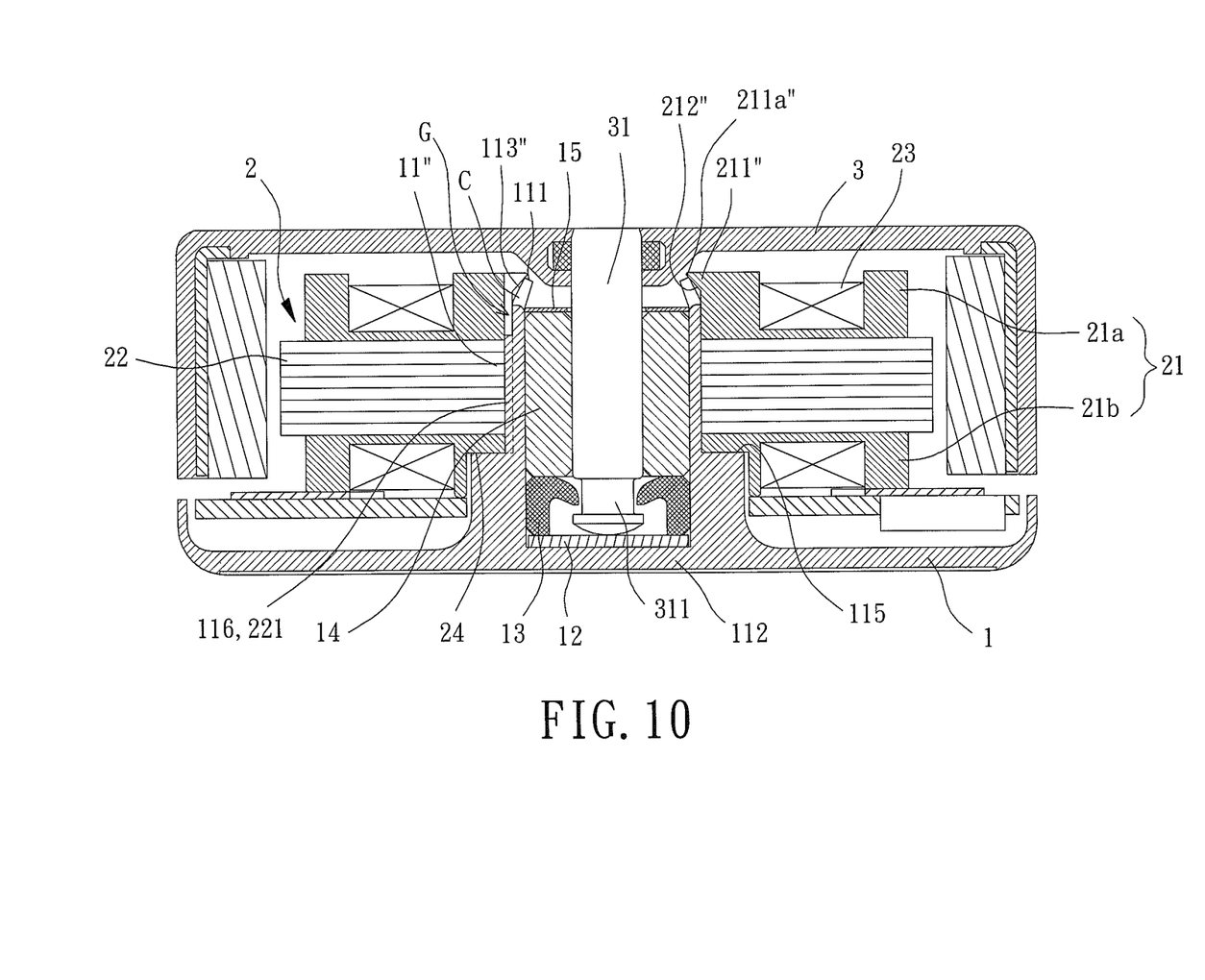
FIG. 10 shows a side cross-sectional diagram of the motor of the second embodiment after the motor is assembled.

In such an arrangement, referring to FIG. 10, when assembling the motor of the second embodiment, the guiding face 212" may also force the deformable portion 113" and an annular corner 211a" of the pressing portion 211" also abuts against the deformable portion 113" to reduce the inner diameter D of the opening end 111 as the shaft tube 11 is being fitted through the stator unit 2.

The component positioning structure of the second embodiment has a similar component positioning function and effect as the component positioning structure of the first embodiment.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A structure comprising:
    a base having a shaft tube, wherein the shaft tube has an inner diameter, an opening end and a closed end opposite to the opening end, with the inner diameter defined by an inner circumferential wall of the shaft tube, with a deformable portion extending axially from an inner annular shoulder portion to the opening end, with the inner annular shoulder portion extending radially outward of the inner circumferential wall and having an inner periphery and an outer periphery opposite to the inner periphery, with a thickness of the shaft tube defined between the inner circumferential wall and an outer circumferential wall opposite to the inner circumferential wall, with a radial thickness of the deformable portion being smaller than the thickness of the shaft tube, with the deformable portion deformable from a receiving position to a deformed position, and with the deformable portion in the receiving position having a size equal to or larger than the inner diameter, with the deformable portion in the deformed position having a reduced size less than the inner diameter; and
    a stator unit fitted to the outer circumferential wall of the shaft tube and having an insulation sleeve and a pressing portion, with an end of the pressing portion having an annular corner radially arranged between the inner periphery and the outer periphery of the inner annular shoulder portion, and with the annular corner of the pressing portion abutting against the deformable portion and deforming the deformable portion from the receiving position to the deformed position.

2. The structure as claimed in claim 1, wherein at least one of the pressing portion and the deformable portion includes a guiding face.

3. The structure as claimed in claim 2, wherein the guiding face is a cambered or inclined face.

4. The structure as claimed in claim 2, wherein the guiding face is formed on the pressing portion and abuts against the deformable portion.

5. The structure as claimed in claim 4, wherein the deformable portion has an auxiliary guiding face abutting against the guiding face of the pressing portion.

6. The structure as claimed in claim 5, wherein the auxiliariy guiding face is a cambered or inclined face.

7. The structure as claimed in claim 1, wherein the pressing portion is in the form of an annular lip integrally formed with the stator unit.

8. The structure as claimed in claim 1, wherein the stator unit includes at least one gap radially arranged on an inner circumferential wall thereof and extending to a top face thereof, and wherein the at least one gap divides the pressing portion into a plurality of protrusions.

9. The structure as claimed in claim 1, wherein the opening end of the shaft tube includes a plurality of interstices extending in an axial direction thereof and extending from the inner diameter through the outer circumferential wall of the shaft tube, and wherein the deformable portion is formed between adjacent two of the plurality of interstices.

10. The structure as claimed in claim 1, wherein the deformable portion is an annular wall.

11. The structure as claimed in claim 1, wherein the shaft tube includes a first annular shoulder portion and the stator unit includes a second annular shoulder portion abutting against the first annular shoulder portion.

12. The structure as claimed in claim 1, further comprising a positioning ring disposed on the inner annular shoulder portion.

13. A structure comprising:
a base having a shaft tube, wherein the shaft tube has an inner diameter, an opening end and a closed end opposite to the opening end, with the inner diameter defined by an inner circumferential wall of the shaft tube, with the opening end having a deformable portion, with a thickness of the shaft tube defined between the inner circumferential wall and an outer circumferential wall opposite to the inner circumferential wall, with a radial thickness of the deformable portion smaller than the thickness of the shaft tube, with the deformable portion deformable from a receiving position to a deformed position, with the deformable portion in the receiving position having a size equal to or larger than the inner diameter, and with the deformable position in the deformed position having reduced size less than the inner diameter; and
a stator unit fitted to the outer circumferential wall of the shaft tube and having an insulation sleeve and a pressing portion, with an end of the pressing portion having an annular corner radially arranged beyond the inner circumferential wall of the shaft tube, and with the annular corner of the pressing portion abutting against the deformable portion and deforming the deformable portion from the receiving position to the deformed position.

14. The structure as claimed in claim 13, wherein at least one of the pressing portion and the deformable portion includes a guiding face.

15. The structure as claimed in claim 14, wherein the guiding face is a inclined face.

16. The structure as claimed in claim 15, wherein the guiding face is formed on the pressing portion and abuts against the deformable portion.

17. The structure as claimed in claim 13, wherein the pressing portion is an annular lip integrally formed with the stator unit.

18. The structure as claimed in claim 13, wherein the opening end of the shaft tube includes a plurality of interstices extending in an axial direction thereof and extending from the inner diameter through the outer circumferential wall of the shaft tube, and wherein the deformable portion is formed between adjacent two of the plurality of interstices.

19. The structure as claimed in claim 13, wherein the shaft tube includes a first annular shoulder portion and the stator unit includes a second annular shoulder portion abutting against the first annular shoulder portion.

20. A structure comprising:
a bearing;
a base including a shaft tube having an outer circumferential wall, wherein the shaft tube has an inner diameter and has an opening end, with the inner diameter defined by an inner circumferential wall of the shaft tube, with the bearing received in the inner circumferential wall of the shaft tube, with the shaft tube having a deformable portion adjacent the opening end, with the deformable portion deformable from a receiving position to a deformed position, with the deformable portion in the receiving having a size equal to or larger than the bearing providing passage of the bearing from the opening end to the inner circumferential wall, with the deformable portion in the deformed position having a reduced size less than the bearing to abut with the bearing received in the inner circumferential wall; and
a stator unit fitted to the outer circumferential wall of the shaft tube and having an insulation sleeve and a pressing portion, wherein the pressing portion abuts against the deformable portion and deforms the deformable portion from the receiving position to the deformed position.

21. The structure as claimed in claim 1, wherein the insulation sleeve includes the pressing portion integrally formed therewith, and wherein the stator unit further comprises another insulation sleeve, a plurality of plates stacked with each other, with the plurality of plates sandwiched between the insulation sleeve and the other insulation sleeve, and a wire wound around the sandwiched plurality of plates and the insulation sleeves to form coils.

\* \* \* \* \*